United States Patent [19]

Gribbin et al.

[11] 4,197,199
[45] Apr. 8, 1980

[54] FILTER PRESSES

[75] Inventors: Michael J. Gribbin; James H. Davenport, both of Newcastle, England

[73] Assignee: Manor Engineering Company Limited, Stoke-on-Trent, England

[21] Appl. No.: 945,250

[22] Filed: Sep. 25, 1978

[30] Foreign Application Priority Data

Oct. 25, 1977 [GB] United Kingdom ............... 44264/77
Nov. 29, 1977 [GB] United Kingdom ............... 49579/77

[51] Int. Cl.$^2$ ............................................. B01D 25/12
[52] U.S. Cl. ...................................... 210/97; 210/143; 210/230
[58] Field of Search .................. 210/224, 230, 228, 97, 210/143

[56] References Cited

U.S. PATENT DOCUMENTS

| 3,232,435 | 2/1966 | Fisher | 210/230 |
|---|---|---|---|
| 3,563,386 | 2/1971 | Kuhita | 210/230 |
| 3,878,102 | 4/1975 | Busse et al. | 210/230 |
| 3,915,863 | 10/1975 | Busse et al. | 210/230 |

Primary Examiner—John Adee
Attorney, Agent, or Firm—Marshall & Yeasting

[57] ABSTRACT

This invention relates to filter presses of the kind comprising a plurality of separate filter plates which are supported by or from a main frame so as to form a stack at one end of the frame during a filtering operation, and which are arranged to be moved one by one towards the opposite end of the frame to enable filter cakes to be removed from between the plates.

The plates are heavy and tend to stick together, and known mechanism for moving the plates individually is either complex and tends to clog with the clay or like being filtered in ordinary usage, or fails to take account of the sticktion resulting in the press jamming.

In the invention, the first plate in the stack which is not to be moved is held in place by a pawl engaged with a rack, and a reciprocating carriage moves across the gap between the open and unopen plates of the stack, shutting the pawl and displacing it to engage with the next plate in the unopen part of the stack and then picking up the released plate and displacing it to the opened part, once in each cycle.

5 Claims, 8 Drawing Figures

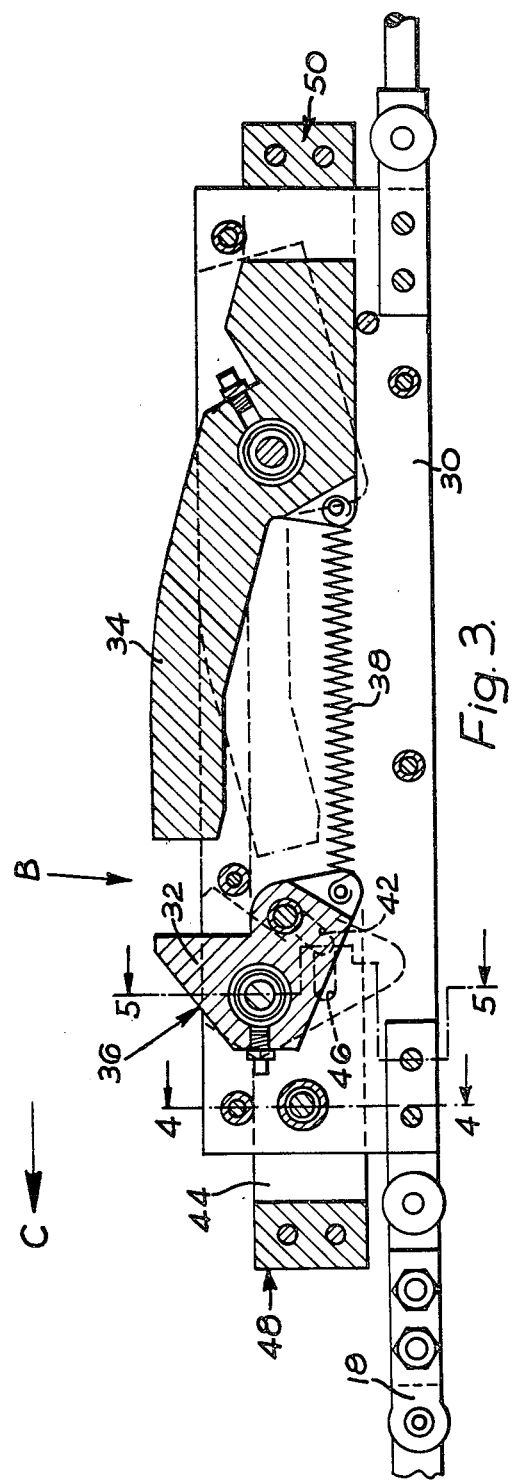
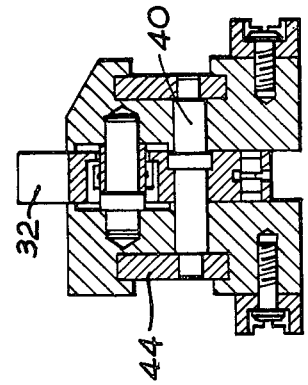
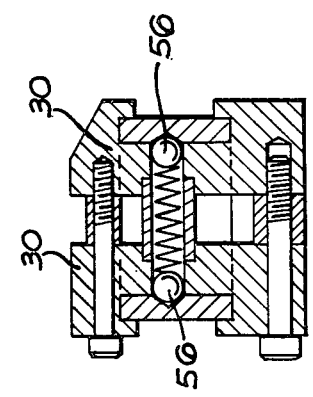

FILTER PRESSES

This invention relates to filter presses of the kind comprising a plurality of separate filter plates which are supported by or from a main frame so as to form a stack at one end of the frame during a filtering opertion, and which are arranged to be moved one by one towards the opposite end of the frame to enable filter cakes to be removed from between the plates.

The individual filter plates have been moved to the cake release position manually, but since they may be large, massive and heavy, this is inherently unsatisfactory. Many different proposals have been put forward for moving the plates mechanically and/or automatically, but certain difficulties are encountered in achieving efficient and satisfactory mechanism for these purposes.

U.K. Pat. No. 1,091,680 discloses a mechanism in which an endless chain is provided at each side of the press, and a series of carriages are provided on the chains. The carriages mount spring-loaded pawls which can engage with projections from the press plates so as to move the plates in the opening direction, and disengage when the plates have been fully opened so as to be carried around end sprockets for the chains, returned to the opposite end of the press and then carry out repeat cycles. However, if a press plate sticks on the press frame, the spring loading of the pawls may be overcome, and possibly this may happen on only one side of the press, allowing a plate to skew out of a condition parallel to the remaining plates, and this cause that plate to become jammed in the frame.

Further, presses of this kind are often used for treating clay and water suspensions and there is inevitably leakage and spillage so that the parts tend to become contaminated with the material being filtered, and any arrangement using relatively precise mechanism tends to become unserviceable as a result.

U.K. Pat. No. 1,389,003 shows an arrangement which is a substantial improvement in these respects, in that only a single carriage is used at each side of the press and this is reciprocated back and forth in the gap between the first plate to be moved and the last plate which has been moved, thus reducing the number of moving parts, and avoiding the necessity for a completely endless chain.

A further problem however which is not solved by the prior art is that of stiction. Relatively great force may be needed to separate the plates, and there is a tendency for two or more plates to move when only the first of those plates is being actually displaced by the carriage because of this.

There have been previous proposals aimed at holding back all of the plates except the one which is intended to be moved, as exemplified for example in U.S. Pat. No. 3,232,435, where each plate is effectively connected to the next by a hook like catch, so that all of the plates which are not to be moved can be held as a block, and the carriage for displacing the plates engages with a plunger which is moved into the operative position when a catch is released. Again however this mechanism is very complex since it has to be repeated on each plate and moreover it is dependent upon the plates being of uniform thickness. Whilst this may be true with a new press, in normal use plates become worn or damaged and have to be repaired, and the end result may be that any one press includes plates of several different thick-nesses. The catch systems are unable to cope with this.

One solution to this problem has been proposed in U.K. Pat. No. 1,441,316, where an arresting element in the form of a rack extends along the length of the press, and each press plate is provided with an individual pawl mechanism to engage with that rack, the pawl having an associated projection which can be engaged by a gravity catch mounted on a carriage, so that the gravity catch can disengage the pawl from the rack and then displace the corresponding plate along the press. Again however the gravity catch may become inoperative through contamination, and the press plate construction is still complicated because of the need for separate moving parts on each and every one of the press plates.

The object of the present invention is to provide improvements which avoids all of these difficulties.

In accordance with the invention a filter press of the kind comprising a plurality filter plates arranged on a frame so as to form a stack at one end of the frame whilst the filtering operation is carried out, and to be movable one by one towards the other end of the frame for filter cake removal, has a carriage provided to reciprocate across the gap between the last-and next-to-be-moved plate with a pawl arranged to abut the plate at one end of the gap so as to limit the extent of reciprocation towards that end, and with another pawl to drag the moved plate in the opposite direction, and provided with means for holding back the plate immediately adjacent to the plate which is to be moved or is moving, said means including a rack extending along the press, is characterised in that the holdback means comprise a second carriage, a catch on the second carriage for engaging said platewhich is immediately adjacent as aforesaid, a pawl engagable between the second carriage and the rack, and is also characterised in that the reciprocable carriage is arrangedto displace the second carriage through a distance approximately equal to the thickness of a single plate once in each cycle of reciprocation.

The invention will be better understood from consideration of the following description with reference to the accompanying drawings wherein:

FIG. 3 is a sectional elevation on an enlarged scale showing a first carriage for plate moving;

Figure 6:
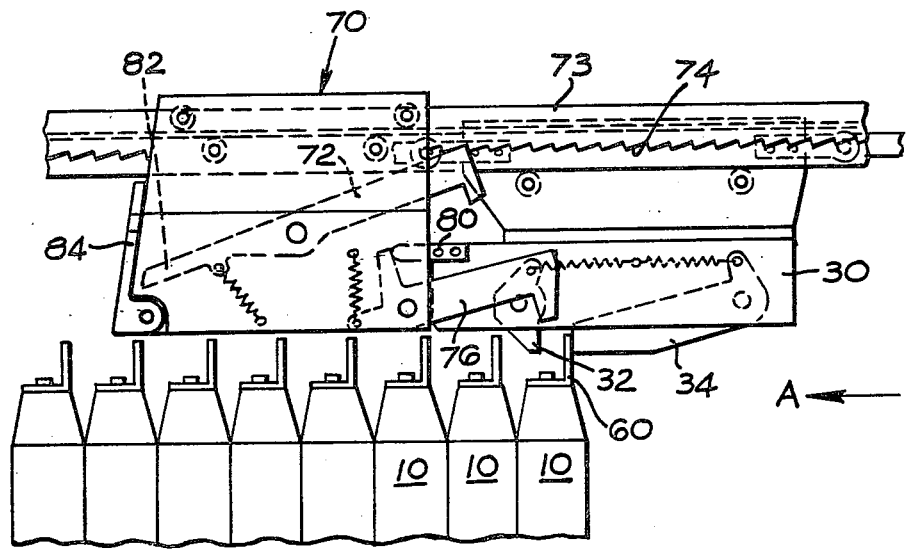
Figure 7:
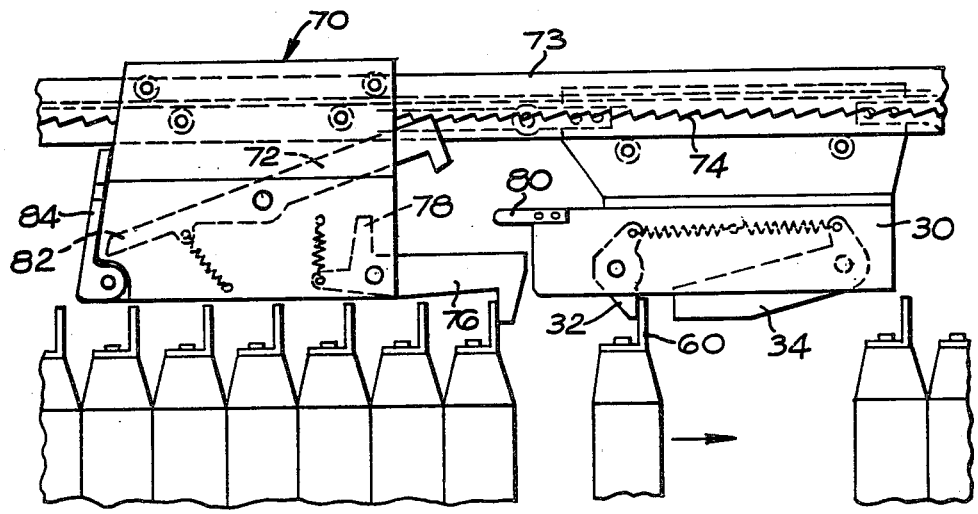
Figure 8:
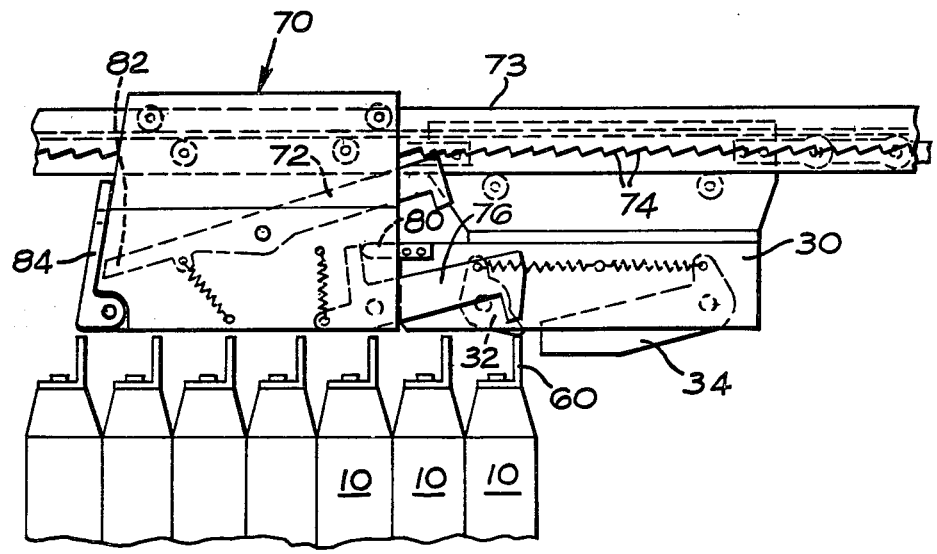

FIGS. 4 and 5 are sections taken on the lines 4—4 and 5—5 of FIG. 3;

FIG. 6 is a fragmentary and somewhat diagrammatic elevation showing one stage of operation of a press;

FIGS. 7 and 8 are views generally similar to FIG. 6 showing different stages in the operation.

Figure 1:
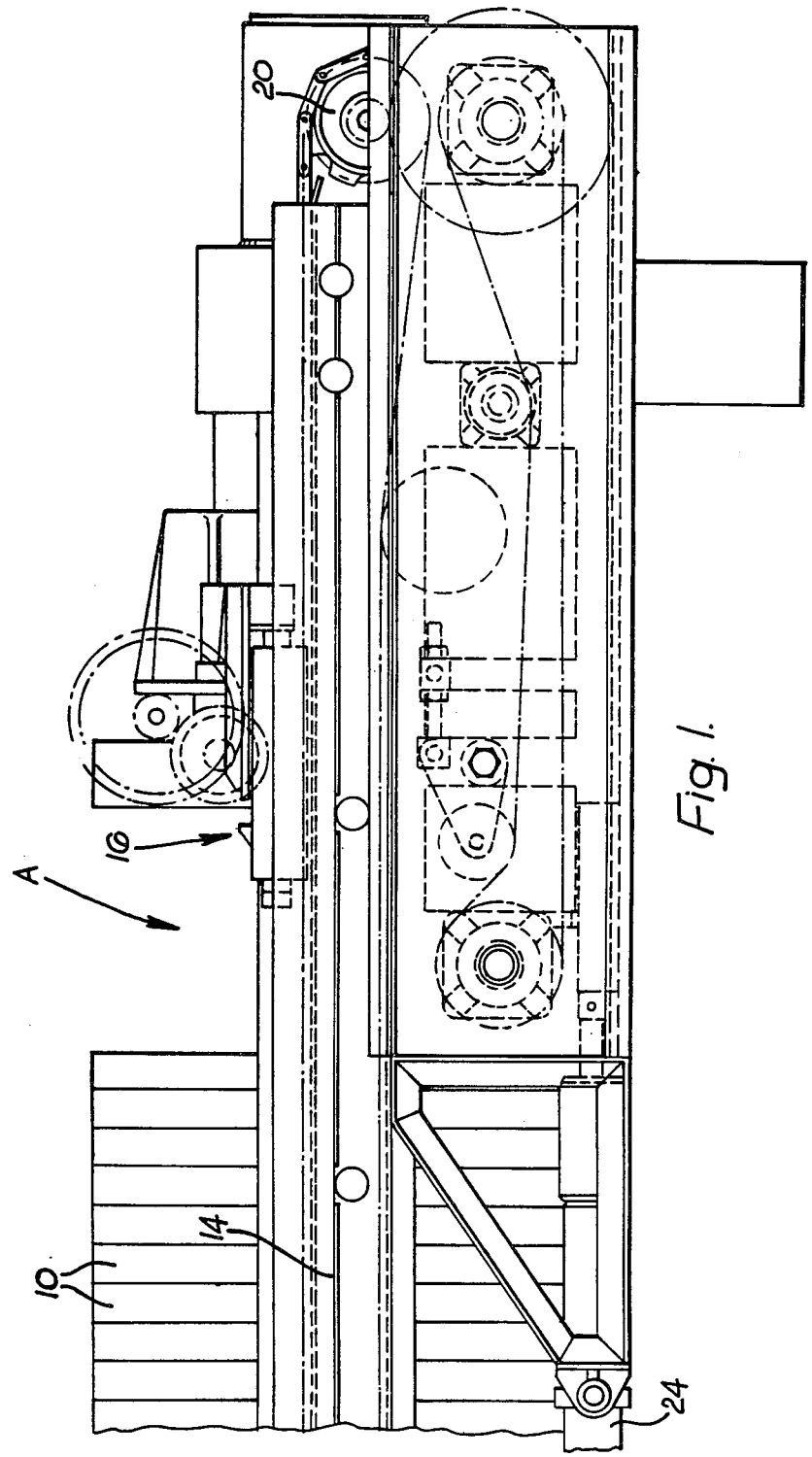
FIG. 1 is a fragmentary elevation of a filter press showing one end of the same.
Figure 2:
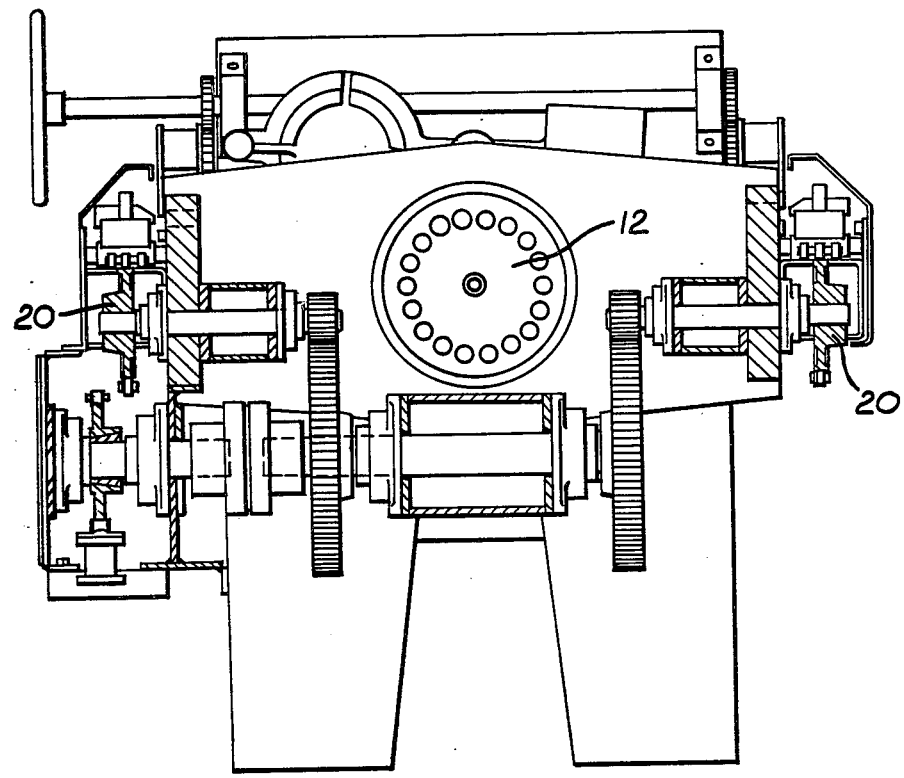
FIG. 2 is an end elevation of the press.

Referring to the drawings and initially to FIGS. 1 and 2 thereof, the press comrises an elongated frame which supports a stack of filter plates generally indicated by the reference numeral 10 FIG. 1. The plates may have transverse coaxial projections which run on side members of the press, such an arrangement being known as a side bar press; or the plates may be suspended from an overhead track for example. A main hydraulic cylinder 12 (FIG. 2) is provided for holding the plates together in a stack towards the left hand end of the press (as seen in the drawings) and this is released when the plates are to be moved.

For this purpose, a track 14 is provided at each side of the press and each track supports a corresponding carriage 16. The two carriages are moved in synchronism, and it is only necessary to describe one. The carriages are attached to roller chains 18 FIG. 3 which run over end sprockets 20. The chains are driven primarily by a hydraulic device arranged so that the chain is automatically reversed by a buildup of pressure in the hydraulic system. In the arrangement actually illustrated, a hydraulic ram 24 drives a gearing system connected to the sprockets, but other systems are possible. The stroke of the ram (in the preferred arrangement) via the gearing is such that the carriage 16 can be displaced from one end of the press to the other in a single ram stroke, although in normal operation this is only necessary once in each complete cycle, and otherwise the carriage merely reciprocates across the gap, as indicated by the reference A FIG. 1, although that gap moves along the length of the machine as individual press plates are transferred from one side of the gap to the other in the press opening sequence.

Turning now to FIGS. 3 to 5, the carriage consists of a pair of side plates 30 which pivotally mount a first pawl 32 and a second pawl 34. The gap B between the adjacent faces of the pawls is slightly larger than the width of the lateral projection from the press plate.

In use, assuming the carriage to be moving in the direction of the arrow C FIG. 3 across the gap A, pawl 32 will pivot clockwise as the inclined face 36 encounters the projection on the first plate at the end of the gap, so that the pawl rides under that projection and is then returned to the illustrated position by spring 38. Pawl 34 will contact the projection and this will stop the carriage, thereby causing the pressure build up, reversal, and movement of the carriage in the opposite direction to that of arrow C. Pawl 32 then pulls the plate across the gap, and when the pawl 34 encounters the projections of the previously moved plates (or a similar projection provided at that end of the press for use when the first of the plates is being moved) it (pawl 34) pivots to the dotted line FIG. 3 below those projections and again the carriage is stopped when the moved plate is brought up against the previously moved plates or against a projection for that purpose at the opening end of the press. This again causes pressure build up and reversal, but on this next stroke the carriage - will move a little further to pick up the next plate and so on.

It will be appreciated that this reciprocatory motion maybe entirely automatic, or a delay may be built in to allow nfilter cake removal, or a switch may be operated so that after completing one reciprocation, the carriage comes to rest until the operation is restarted for the next plate.

When all of the plates have been moved, and all of the filter cakes removed, the plates are returned to the left hand end of the press for a fresh filtering operation, and it is necessary to return the carriage by a complete stroke of the ram, that is from the left hand end of the press to the right hand end of the press ready to commence the fresh opening cycle. During this return movement, pawl 34 will engage the projections of the plates and automatically move to the dash line position so that it will not impede progress (and be spring returned upwardly at the end) and means are provided to displace the pawl 32 to an inoperative position and subsequently return it to the operative position. To this end, the pawl 32 carries a pin 40 (FIG. 5) which runs in arcuate slots 42 in the carriage side plates 30 and also extends through complimentary slots in a stop bar 44. The slots in the stop bar include an additional locking portion 46, and the stop bar is guided to slide relative to the carriage in the direction of the arrow C (and the opposite direction). As the carriage reaches the left hand end of the press, the end 48 of the stop bar hits a projection so as to displace the stop bar. This takes the locking portion 46 of the slot across the endsof the pin 40, so that the pawl 32 which has been moved to the dash line position of FIG. 3 by an appropriate further projection at the head end of the press is locked in the downward or dash line position. At the same time contact of part of the carriage with a fixed part of the head end of the press causes the pressure build up for carriage reversal, but since there is now no impediment to travel of the carriage it completes a traverse until it is in the position shown in FIG. 1. when the opposite end 50 of the stop bar contacts a projection to return the stop bar to the position illustrated in FIG. 3, free the pawl 32 to return to the illustrated position under the influence of the spring 38, and at the same time reverse the direction of carriage movement ready for the first plate opening movement.

Spring loaded detents are provided for the stop bars (which may be duplicated on each carriage as illustrated) and as shown by the reference numerals 54 56, so as to ensure that the stop bar remains in either the illustrated position or the lock position and is not inadvertently moved therefrom when this is not required.

Turning now to FIGS. 6 to 8, the press shown therein is generally similar to those illustrated with reference to FIGS. 1 to 5, except that instead of the press plates being provided with transverse projections so that a pair of carriages is used, the plates are provided with top projections 60 to like effect, but so that only a single carriage may be required located generally over the centre line of the plates. With this change in mind, the carriage is effectively inverted from the position illustrated in the other figures, so that pawls 32 34 project downwardly from the carriage instead of upwardly.

FIGS. 6 to 9 show the second carriage, generally indicated by reference 70 which runs on a guide member 73 which is provided with a series of rack teeth 74 on its lower face. The teeth are equipitched and theremay be for example four teeth per press plate. Carriage 70 is provided with pawl 72 of which the upper end engages with the rack, being spring urged into engagement with the rack. Carriage 70 is also provided with pawl 76 which is arranged to hook engage with the press plate projections 60 as best seen in FIG. 7. Pawl 76 has a projection 78 arranged to be tripped by projection 80 from the carriage 30.

FIG. 6 shows the operation when pawl 34 has contacted the projections 60 of the first plate which is to be moved, and projection 80 has tripped the pawl 76 against its spring loading thus releasing it from the press plate projection with which it was previously engaged. The carriage 30 has also displaced the carriage 70 by abutment between the two carriages, but the pawl 72 has been spring returned to the next suitably located rack tooth 74.

When the carriage 30 begins to move to the right from the FIG. 6 position, a certain amount of movement is possible before pawl 32 engages the plate projection. This movement is sufficient to withdraw projection 80 from the pawl 76 to allow it to be spring returned to lie in the path of the first of the press plates which is not to be moved, that is the one immediately adjacent to the one which is to be moved. Hence, FIG. 7 shows the carriage moving to the right dragging one press plate with it, with the remaining plates being held back by pawl 76. FIG. 8 shows the carriage on its return, at a point shortly before that illustrated in FIG. 6 where pawl 76 has just been released and displaced fractionally with carriage 70.

The purpose of providing a multiple of rack teeth for each press plate is that in the event of a press plate varying from a standard thickness, the pawl 72 can still engage with a rack tooth and in an approximately correct position.

The last rack tooth towards the head end of the press may be extended downwardly, so that as the carriage is displaced towards that rack tooth the pawl 72 will be pivoted clockwise and its rear end 82 may displace spring loaded lever 84 urging the same anticlockwise, until the tip 82 snaps past that lever where upon the pawl will be held in a disengaged position from the rack ready for reciprocation along the rack from the one end of the press to the other ready for the next cycle of operations. When the carriage 70 reaches the right hand end of the press, a fixed finger may enter the carriage 70 so as to displace the lever 84 anticlockwise and release the pawl 72 for spring return to the operative position, and upon the initial movement of the carriage 70 across the gap towards the first plate to be moved, the lever 84 will be spring returned to the operative position as illustrated in the drawings.

As previously described, the carriage 30 is reciprocated by hydraulic means, and a pressure limit switch in the hydraulic circuit causes carriage reversal. Preferably the limits which is adjustable with respect to the pressure value which causes the reversal, and it has been found that this is particularly useful in practise, since if any plate is subject to stiction, and if the stiction exceeds the value to which the limit switch is set, the carriage 30 will undergo a further reversal in movement direction when it is unable to displace the relevant plate. The movement is terminated as soon as the clearance between the stop pawl 34 and the plate projection is taken up, so that it is for a distance less than the pitch of the plates in the closed position. Abutment of the stop 34 with the plate projection causes another reversal so that the plate moving pawl or catch 32 again contacts the plate which is to be moved. If the stiction is still not overcome, the carriage may continue to reciprocate back and forth for this small distance, and effectively the plate is subject to a series of impacts as the moving pawl 32 hits the plate projection and in practise even the most stubborn plate can then be moved.

We claim:

1. A filter press of the kind comprising a plurality of filter plates (10) arranged on a frame so as to form a stack at one end of the frame whilst the filtering operation is carried out, and to be movable one by one towards the other end of the frame for filter cake removal, in which a carriage (30) is provided to reciprocate across the gap (A) between the last-and-next-to-be-moved plates with a pawl 34 to abut the plates in one direction to limit the extent of the reciprocation and another pawl 32 to drag the moved plate in the opposite direction, and provided with means for holding back the plate immediately adjacent to the plate which is to be moved or is moving, said means including a rack (73,74) extending along the press, characterised in that the holdback means comprise a second carriage (70) a catch (76) on the second carriage for engaging said plate which is immediately adjacent as aforesaid, a pawl (72) engagable between the second carriage and the rack, and also characterised in that the reciprocable carriage is arranged to displace the second carriage through a distance approximately equal to the thickness of a single plate once in each cycle of movement.

2. A filter press as claimed in claim 1 characterised in that the reciprocable carriage (30) is provided with lock means (40–50) for holding down the plate moving pawl (32) during a reciprocation of the carriage from one end of the press to the other between successive complete cycles.

3. A filter press as claimed in claim 1 wherein the rack has a plurality of teeth per press plate.

4. A filter press as claimed in claim 1 wherein the pawl (72) is provided with means (84) for holding it disengaged from the rack during a complete reciprocation of the carriage (70) between successive complete cycles of the press.

5. A filter press as claimed in claim 1 characterised in that the carriage (30) is reciprocable by hydraulic means and the hydraulic circuit includes a pressure limit switch arranged to reverse the direction of carriage movement when the pressure exceeds a predetermined limit as when the stiction exceeds the plate displacing force, whereby the carriage will hunt back and forth in relation to the same plate until the stiction is overcome.

* * * * *